(12) United States Patent
Anderson et al.

(10) Patent No.: US 11,941,609 B2
(45) Date of Patent: *Mar. 26, 2024

(54) ADDING A CREDIT ACCOUNT TO A MOBILE WALLET TO MAKE A TRANSACTION WHEN THE PHYSICAL CARD ASSOCIATED WITH THE CREDIT ACCOUNT IS UNAVAILABLE

(71) Applicant: BREAD FINANCIAL PAYMENTS, INC., Columbus, OH (US)

(72) Inventors: Chris Anderson, Columbus, OH (US); Jess Lawrence, Lewis Center, OH (US); Manoj Ram Tammina, Columbus, OH (US)

(73) Assignee: BREAD FINANCIAL PAYMENTS, INC., Columbus, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/491,524

(22) Filed: Sep. 30, 2021

(65) Prior Publication Data

US 2022/0027891 A1     Jan. 27, 2022

Related U.S. Application Data

(63) Continuation of application No. 16/709,760, filed on Dec. 10, 2019, now Pat. No. 11,164,178.

(Continued)

(51) Int. Cl.
*G06Q 20/36* (2012.01)
*G06Q 20/10* (2012.01)
(Continued)

(52) U.S. Cl.
CPC ............ *G06Q 20/36* (2013.01); *G06Q 20/10* (2013.01); *G06Q 20/3221* (2013.01); *G06Q 20/40* (2013.01)

(58) Field of Classification Search
CPC .... G06Q 20/36; G06Q 20/10; G06Q 20/3221; G06Q 20/40
(Continued)

(56) References Cited

U.S. PATENT DOCUMENTS 7,207,480 B1    4/2007   Geddes
8,285,329 B1   10/2012   Zhu
(Continued)

FOREIGN PATENT DOCUMENTS

CA          3076931 A1    10/2020

OTHER PUBLICATIONS

SyndiGate Media Inc., Draft rules for the Issuance and circulation of electronic money published, Proquest Doc. Id. 2333979444. (Year: 2007).*

(Continued)

*Primary Examiner* — Frantzy Poinvil (57) ABSTRACT

A system and method for adding a virtual credit account to a mobile device is disclosed. The system receives a contact information for a customer at a store's electronic device, the contact information comprising: at least one of a device identifier (ID) and a user ID, the contact information being part of a request for a pre-existing credit account to be added to the customer's mobile device. An access to an account lookup/verification for the pre-existing credit account is provided to the customer's mobile device, the access generate an out-of-band verification. the request for the pre-existing credit account to be added to the customer's mobile device in conjunction with the out-of-band verification is provided by the customer's mobile device. The pre-existing credit account is then added to the customer's mobile device in a digital format allowing the customer to make a purchase.

15 Claims, 7 Drawing Sheets

Related U.S. Application Data (60) Provisional application No. 62/829,346, filed on Apr. 4, 2019.

(51) Int. Cl.
*G06Q 20/32* (2012.01)
*G06Q 20/40* (2012.01)

(58) Field of Classification Search
USPC ........................................................ 705/3–44
See application file for complete search history.

(56) References Cited

U.S. PATENT DOCUMENTS

| | | | |
|---|---|---|---|
| 8,332,313 B2 | 12/2012 | Doran et al. | |
| 8,538,879 B2* | 9/2013 | Galit ........................ | G07F 7/086 |
| | | | 705/41 |
| 8,577,810 B1 | 11/2013 | Dalit et al. | |
| 8,762,268 B2 | 6/2014 | Wall et al. | |
| 8,793,777 B2 | 7/2014 | Colson | |
| 8,879,846 B2 | 11/2014 | Amtrup et al. | |
| 8,925,802 B1 | 1/2015 | Pletz et al. | |
| 9,038,153 B2 | 5/2015 | Barber | |
| 9,082,119 B2 | 7/2015 | Ortiz et al. | |
| 9,721,147 B1 | 8/2017 | Kapczynski | |
| 9,818,093 B1 | 11/2017 | Grier | |
| 10,331,950 B1* | 6/2019 | Suriyanarayanan ..... | G06N 5/01 |
| 10,387,862 B2 | 8/2019 | Laracey | |
| 10,395,254 B1* | 8/2019 | Krausz ............... | G06Q 20/3829 |
| 10,574,692 B2 | 2/2020 | Drake | |
| 10,748,136 B1* | 8/2020 | Zaki ................... | G06Q 20/3821 |
| 10,825,028 B1* | 11/2020 | Kramme ................. | G06N 5/046 |
| 11,509,485 B2* | 11/2022 | Jin ........................ | H04L 9/0869 |
| 2006/0129833 A1* | 6/2006 | Ellmore ................ | H04L 63/168 |
| | | | 713/183 |
| 2008/0126145 A1 | 5/2008 | Rackley et al. | |
| 2013/0018798 A1* | 1/2013 | Scipioni ................ | G06Q 20/10 |
| | | | 705/44 |
| 2013/0054454 A1 | 2/2013 | Purves et al. | |
| 2014/0012739 A1* | 1/2014 | Wall ..................... | G06Q 20/383 |
| | | | 705/39 |
| 2014/0052636 A1 | 2/2014 | Mattes | |
| 2014/0136353 A1 | 5/2014 | Goldman et al. | |
| 2014/0207575 A1 | 7/2014 | Freed-Finnegan et al. | |
| 2014/0279474 A1 | 9/2014 | Evans et al. | |
| 2015/0058146 A1 | 2/2015 | Gaddam et al. | |
| 2015/0220914 A1 | 8/2015 | Purves et al. | |
| 2015/0248726 A1 | 9/2015 | Pontious | |
| 2015/0347715 A1 | 12/2015 | Tilzer et al. | |
| 2015/0348044 A1 | 12/2015 | Smith | |
| 2016/0005042 A1 | 1/2016 | Tervo et al. | |
| 2016/0162885 A1 | 6/2016 | Bondesen et al. | |
| 2016/0241549 A1 | 8/2016 | Labaton | |
| 2016/0379192 A1 | 12/2016 | Purves et al. | |
| 2017/0069023 A1 | 3/2017 | Rose et al. | |
| 2017/0109745 A1* | 4/2017 | Al-Bedaiwi ............ | H04L 67/53 |
| 2017/0278095 A1 | 9/2017 | Heeter et al. | |
| 2018/0025331 A1 | 1/2018 | Dallenbach et al. | |
| 2018/0167387 A1 | 6/2018 | Bhatt et al. | |
| 2018/0174149 A1 | 6/2018 | Goldschmidt | |
| 2020/0092723 A1* | 3/2020 | McClement .......... | H04W 12/06 |
| 2020/0320511 A1 | 10/2020 | Anderson et al. | |
| 2021/0027365 A1* | 1/2021 | Resheff .............. | G06Q 20/4014 |

OTHER PUBLICATIONS

Willard, Caroline, "How to fight account Takeover Fraud", Credit Union Times: n/a. ALM Media Properties, Proquest Document Id. 179596967, Jun. 5, 2016.*

Maurer, "Payment: forms and Functions of Value Transfer in Contemporary Society", Cambridge Anthropology, Oxford, vol. 30, Iss. 2, Autumn 2012, 15-35.

* cited by examiner

```
┌─────────────────────────────────────────────────────────────────┐
│ IN RESPONSE TO A CUSTOMER ATTEMPTING TO UTILIZE THE DIGITAL CARD│
│   THE MOBILE WALLET FOR PAYMENT: CUSTOMER BIOMETRICS ARE        │
│         REQUESTED FROM THE CUSTOMER'S MOBILE DEVICE             │
│                              410                                │
└─────────────────────────────────────────────────────────────────┘
                                │
                                ▼
┌─────────────────────────────────────────────────────────────────┐
│           ACCESSING A PHYSICAL LOCATION OF THE MOBILE DEVICE    │
│                              420                                │
└─────────────────────────────────────────────────────────────────┘
                                │
                                ▼
┌─────────────────────────────────────────────────────────────────┐
│           ACCESSING A TIME AT WHICH THE BIOMETRICS ARE ACCESSED │
│                              430                                │
└─────────────────────────────────────────────────────────────────┘
                                │
                                ▼
┌─────────────────────────────────────────────────────────────────┐
│           ACCESSING A DATE AT WHICH THE BIOMETRICS ARE ACCESSED │
│                              440                                │
└─────────────────────────────────────────────────────────────────┘
                                │
                                ▼
┌─────────────────────────────────────────────────────────────────┐
│ PROVIDING BIOMETRIC SECURITY FOR THE DIGITAL CARD IN THE MOBILE │
│     WALLET IS BASED ON THE BIOMETRICS OF THE CUSTOMER, THE      │
│  COORDINATES OF THE PHYSICAL LOCATION OF THE CUSTOMER'S MOBILE  │
│   DEVICE, THE TIME AT WHICH THE BIOMETRICS ARE ACCESSED, AND THE│
│           DATE AT WHICH THE BIOMETRICS ARE ACCESSED             │
│                              450                                │
└─────────────────────────────────────────────────────────────────┘
```

ADDING A CREDIT ACCOUNT TO A MOBILE WALLET TO MAKE A TRANSACTION WHEN THE PHYSICAL CARD ASSOCIATED WITH THE CREDIT ACCOUNT IS UNAVAILABLE

CROSS-REFERENCE TO RELATED APPLICATIONS

This application is a continuation and claims priority to and the benefit of co-pending U.S. patent application Ser. No. 16/709,760, filed on Dec. 10, 2019, entitled "ADDING A CREDIT ACCOUNT TO A MOBILE WALLET TO MAKE A TRANSACTION WHEN THE PHYSICAL CARD ASSOCIATED WITH THE CREDIT ACCOUNT IS UNAVAILABLE" by Chris Anderson et al, and assigned to the assignee of the present application, hereby incorporated by reference in its entirety.

U.S. patent application Ser. No. 16/709,760 claims priority to and benefit of then U.S. Provisional Patent Application No. 62/829,346 filed on Apr. 4, 2019, entitled "ADDING A CREDIT ACCOUNT TO A MOBILE WALLET TO MAKE A TRANSACTION WHEN THE PHYSICAL CARD ASSOCIATED WITH THE CREDIT ACCOUNT IS UNAVAILABLE" by Chris Anderson, and assigned to the assignee of the present application, the disclosure of which is hereby incorporated herein by reference in its entirety.

BACKGROUND

Credit card companies often require merchants to check the picture identification of a person using a credit card issued by their company. These requirements help to reduce credit card fraud. However, these requirements are also burdensome and time consuming for the merchant and the customer alike. Additionally, a customer could have numerous different cards for credit accounts, reward memberships, offers, coupons, and the like. moreover, if the customer forgets to take one or all of their credit cards with them while shopping, many times, they are not able to purchase a desired object, utilize a provided reward during the purchase, utilize the forgotten coupon, or the like.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description should not be understood as being drawn to scale unless specifically noted.

DESCRIPTION OF EMBODIMENTS

Reference will now be made in detail to embodiments of the subject matter, examples of which are illustrated in the accompanying drawings. While the subject matter discussed herein will be described in conjunction with various embodiments, it will be understood that they are not intended to limit the subject matter to these embodiments. On the contrary, the presented embodiments are intended to cover alternatives, modifications and equivalents, which may be included within the spirit and scope of the various embodiments as defined by the appended claims. Furthermore, in the Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Notation and Nomenclature

Unless specifically stated otherwise as apparent from the following discussions, it is appreciated that throughout the present Description of Embodiments, discussions utilizing terms such as "selecting", "outputting", "inputting", "providing", "receiving", "utilizing", "obtaining", "updating", "accessing", "changing", "deciding", "determining", "interacting", "searching", "pinging" or the like, often refer to the actions and processes of an electronic computing device/system, such as a desktop computer, notebook computer, tablet, mobile phone, and electronic personal display, among others. The electronic computing device/system manipulates and transforms data represented as physical (electronic) quantities within the circuits, electronic registers, memories, logic, and/or components and the like of the electronic computing device/system into other data similarly represented as physical quantities within the electronic computing device/system or other electronic computing devices/systems.

It should be appreciated that the obtaining, accessing, or utilizing of information conforms to applicable privacy laws (e.g., federal privacy laws, state privacy laws, etc.).

Overview

The discussion provides a novel method for adding a tender vehicle to a mobile wallet on a user's mobile device. By leveraging device identity fraud software and using a customer search engine a pre-existing credit account customer can be validated and a digital shopping pass or a provision can be sent directly to their devices mobile wallet so the customer can use their credit account immediately and without having access to the physical card.

In one embodiment, the tender vehicle is a pass and not a card. In one embodiment, the tender vehicle is based on a pre-existing credit account with an associated physical card and is placed in the mobile wallet and linked to the pre-existing credit account. In one embodiment, the tender vehicle is additionally associated with one or more of a plurality of other shopping vehicles such as store brand credit accounts, rewards accounts, coupons, offers, non-branded credit accounts, etc.

Importantly, the embodiments of the present invention, as will be described below, provide an approach for mobile wallet utilization which differs significantly from the conventional processes used to provide payment information, rewards information, coupon information and the like, during a transaction. In conventional approaches, the credit/reward/coupons were found in one or more of a combination of a piece of plastic, a piece of paper, an electronic mail, an attachment to an email, a mailer, a plurality of different applications on a mobile device, a plurality of different cards in a mobile wallet, and the like. As such, it was likely that a customer would not have (or easily access, find, etc.) one or more coupons/rewards/credit accounts, etc. available to them at the time of purchase. For example, the coupons and rewards could be in pockets, in emails, spread through a plurality of applications on the customer's mobile device, etc.

Since the customer receives offers, coupons, rewards memberships, and different credit accounts, via the mail, register receipts, electronic aspects (e.g., email, mobile cards in a mobile wallet, etc.) via the internet, and the like, the ability to track and properly utilize different credit accounts, coupons, offers, rewards, points, and the like cannot be simply adjusted to use on a computing device or handled over a network. Instead, the present embodiments described herein, require a completely new and different system that that which was is presently used. Moreover, ensuring that the customer's appropriate credit account, rewards, offers, coupons and the like, are available and used at the time of transaction is different than even the present use of mobile payment that is performed at the POS.

For example, finding the appropriate paper, plastic, or electronic credit account, reward information, coupons and the like is tedious, time-consuming, and often causes worry or concern if the appropriate items cannot be quickly found at the time of checkout. The worry, concern, and embarrassment can be even greater if the customer determines that they have forgotten their credit card and have no way to pay for the items that have been rung up. However, the present embodiments, as will be described and explained below in detail, provide a previously unknown and Internet-centric procedure for requesting, obtaining, and utilizing a single tender vehicle in the mobile wallet of the customer's mobile device to provide a customer with the appropriate credit account to make payment. In one embodiment, the single tender vehicle is linked not only to the pre-existing credit account, but also to rewards, coupons, and offers available to the customer at the time of purchase.

Thus, embodiments of the present invention provide a capability to link credit accounts, reward accounts, coupons, offers, and the like, which is completely different than what was previously done because of the Internet-centric centralized aspect of the mobile wallet single tender vehicle.

As will be described in detail, the various embodiments of the present invention do not merely implement conventional mobile payment processes on a mobile device. Instead, the various embodiments of the present invention, in part, provide a novel process for requesting, obtaining, and utilizing a single tender vehicle in a mobile wallet to provide some or all aspects of the purchasing process, which is necessarily rooted in Internet-centric computer technology to overcome a problem specifically arising in the realm of forgotten payment cards.

Moreover, the embodiments do not recite a mathematical algorithm; nor do they recite a fundamental economic or longstanding commercial practice. Instead, they address a business challenge that has been born in the Internet-centric environment. Thus, the embodiments do not merely recite the performance of some business practice known from the pre-Internet world along with the requirement to perform it on a computing device. Instead, the embodiments are necessarily rooted in network-centric environments in order to overcome new problems specifically arising in the realm of mobile payment with respect to credit accounts, rewards, offers, and the like.

Operation

Figure 1:
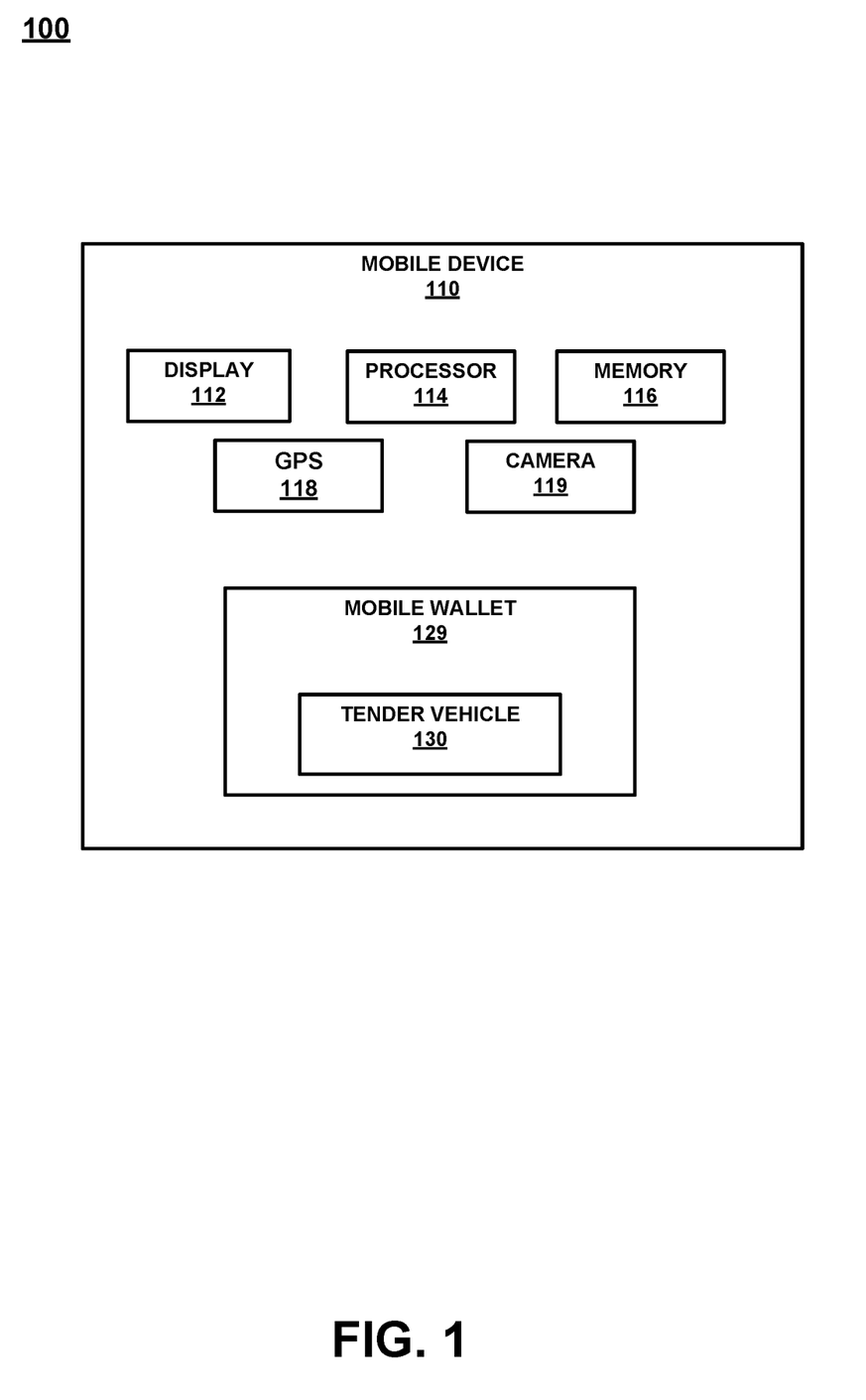
FIG. 1 is a block diagram of a mobile device, in accordance with an embodiment.

Referring now to FIG. 1, a block diagram of a mobile device 110 is shown. Although a number of components are shown as part of mobile device 110, it should be appreciated that other, different, more, or fewer components may be found on mobile device 110.

In general, mobile device 110 is an example of a customer's mobile device, a store's mobile device, an associate's mobile device, or the like. Mobile device 110 could be a mobile phone, a smart phone, a tablet, a smart watch, a piece of smart jewelry, smart glasses, or other user portable devices having wireless connectivity. For example, mobile device 110 would be capable of broadcasting and receiving via at least one network, such as, but not limited to, WiFi, Cellular, Bluetooth, NFC, and the like. In one embodiment, mobile device 110 includes a display 112, a processor 114, a memory 116, a GPS 118, a camera 119, and the like. In one embodiment, instead of providing GPS information, the location of mobile device 110 may be determined within a given radius, such as the broadcast range of an identified beacon, a WiFi hotspot, overlapped area covered by a plurality of mobile telephone signal providers, or the like.

Mobile device 110 also includes a mobile wallet 129 (passbook, or the like) which is an electronic application that operates on mobile device 110. Mobile wallet 129 includes tender vehicle 130. In one embodiment, tender vehicle 130 is linked to a pre-existing credit account. In general, tender vehicle 130 could be a digital credit account, a digital temporary shopping pass, a one-time use pass, a limited-time use pass, a digital credit account with a credit limit that is less than the credit limit on the pre-existing credit account, or the like.

In general, tender vehicle 130 allows a customer to request, obtain, and utilize a single mobile payment method that is linked to one or more credit account information, reward account information, offers, coupons, and the like, and is carried in a secure digital form on a mobile device 110. Instead of using a physical plastic card to make purchases, a mobile wallet allows a customer to pay via mobile device 110 in stores, in apps, or on the web.

Figure 2:
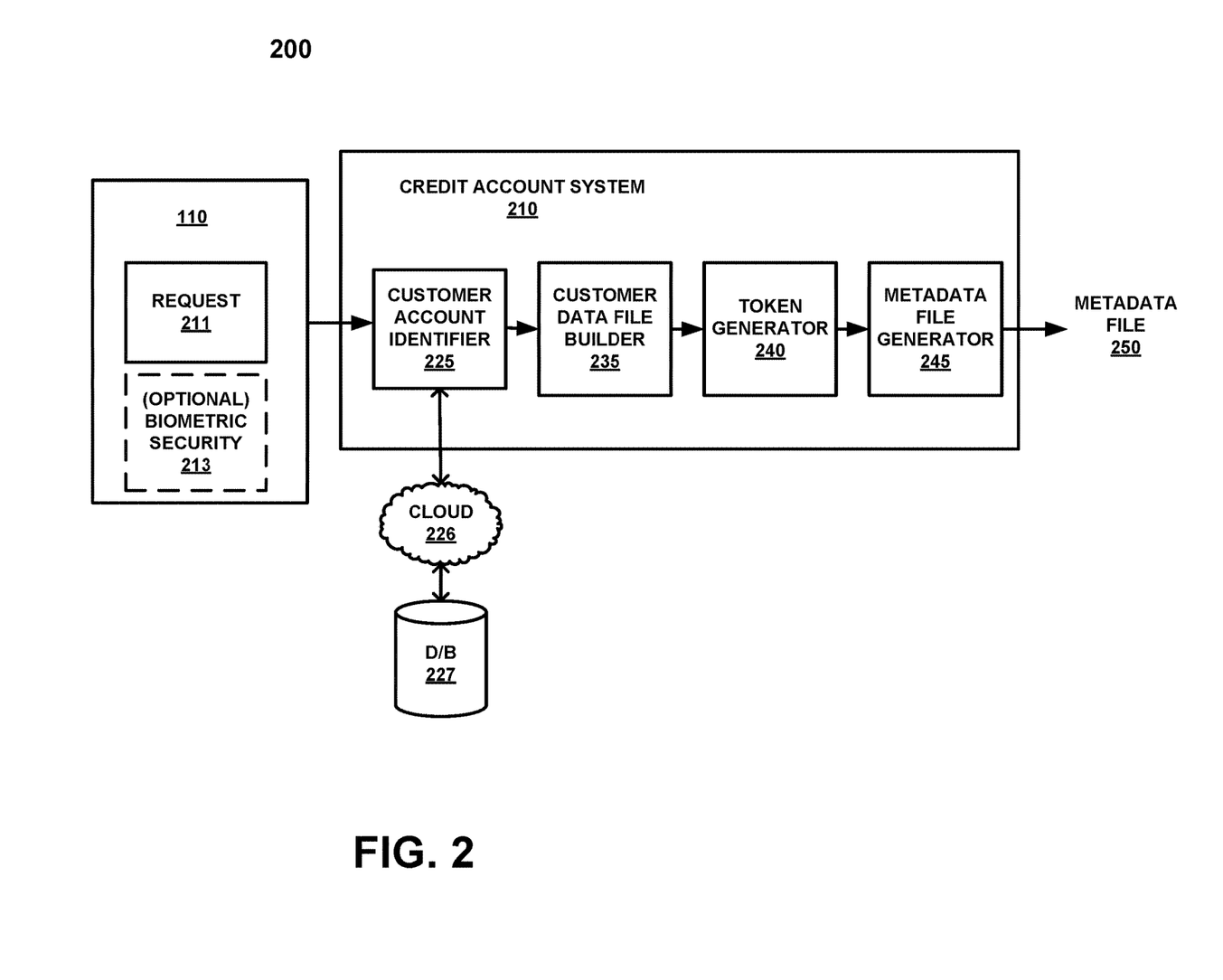
FIG. 2 is a block diagram of a system for adding a customer ID with purchase capability to a mobile wallet, in accordance with an embodiment.

With reference now to FIG. 2, a block diagram of a system 200 for requesting, generating, linking, obtaining, and utilizing a tender vehicle 130 (linked to a pre-existing credit account) via a mobile wallet 129 of a customer's mobile device 110 is shown in accordance with an embodiment. FIG. 2 includes mobile device 110, request 211, optional biometric security 213, credit account system 210, cloud 226, database 227, and metadata file 250.

Figure 5:
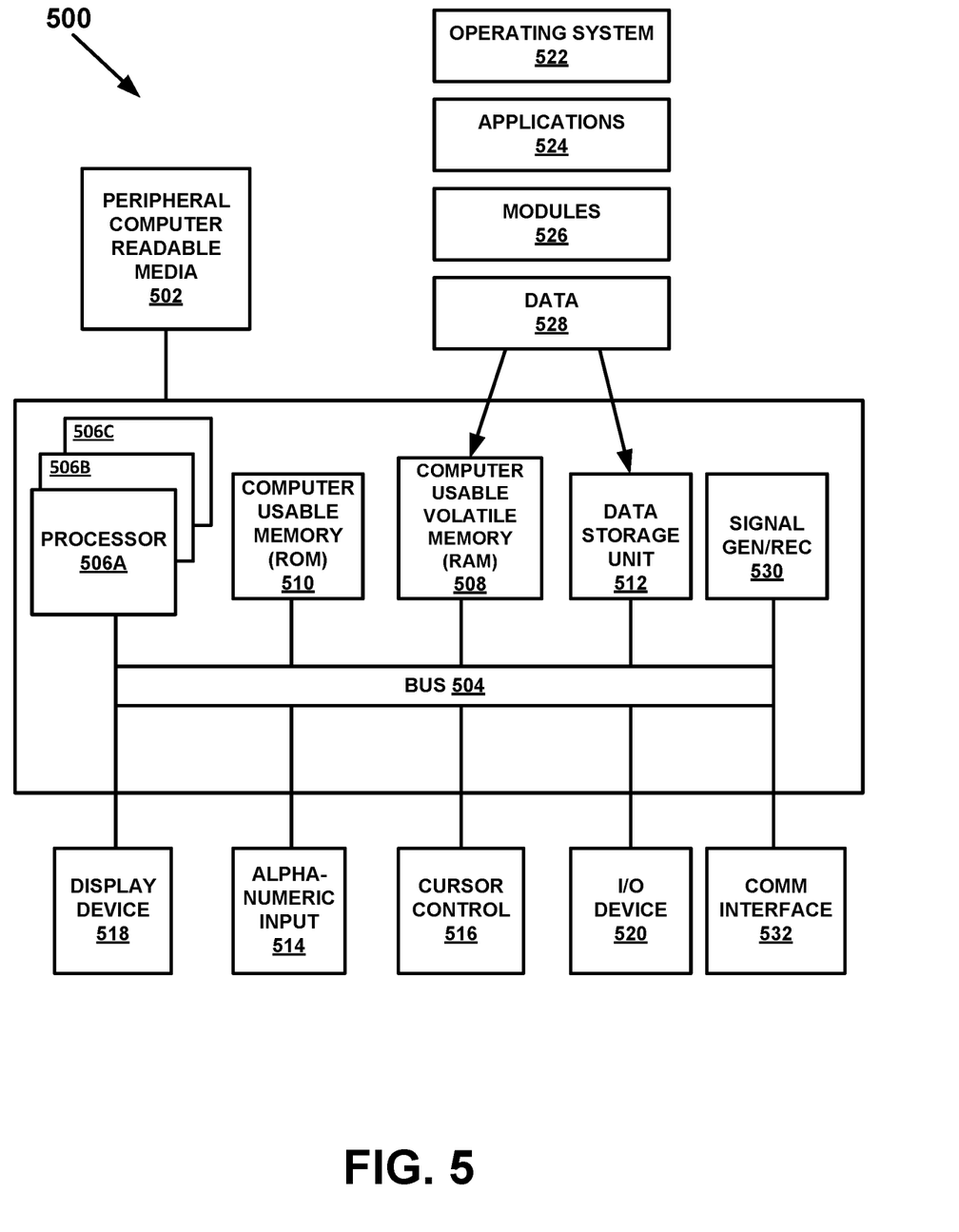
FIG. 5 is a block diagram of an example computer system with which or upon which various embodiments of the present invention may be implemented.

In one embodiment, credit account system 210 is a computing system such as computer system 500 described in detail in the FIG. 5 discussion herein. In one embodiment, credit account system 210 includes a customer account identifier 225, a customer data file builder 235, a token generator 240, and a metadata file generator 245.

In one embodiment, credit account system 210 receives the request 211 for a tender vehicle 130 to be added to the customer's mobile wallet. In one embodiment, the request 211 includes customer identification and/or mobile device 110 identification information. The request 211 is a request for a digital tender vehicle to be generated from a pre-existing credit account. In one embodiment, the request 211 does not include any information about the pre-existing credit account. For example, the customer has arrived at a location (such as a shop, parking lot, etc.) without their physical credit card tied to the existing credit account. As such, the customer does not have access to the credit card account number (VAN/PAN), expiration date, CVV, or the like. Instead, the customer is requesting that they be identified based on their mobile device 110 identification and/or their provided user identification information.

In general, a mobile device ID can include one or more identification characteristics such as: a telephone number, a serial number, an international mobile equipment identity (IMEI), an integrated circuit card identifier (ICCID) (e.g., the SIM card number), a mobile equipment identifier (MEID), a secure element chipset identify (SEID), a media access control (MAC) address, an Internet protocol (IP) address, a universal unique identifier (UUID), a model number, a product number, a serial number, or the like.

In one embodiment, the mobile device ID can be based upon an evaluation of which of the possible mobile device ID's would provide the best capability for fraud prevention. For example, a user's phone number could be easily obtained (e.g., via social media, public records, white pages, Internet search, etc.) so it would be a lower mobile device ID option on a fraud scale. In contrast, the mobile device's serial number, IMEI, ICCID, MEID, SEID, or the like is much less likely to be obtained fraudulently (via social media, public records, guessed, etc.) so it may be that one of the IMEI, ICCID, MEID, SEID, or the like would be the mobile device ID requested due to the higher fraud prevention value.

User ID can be information such as: name, zip code, social security number or portion thereof, driver's license number or portion thereof, or the like that is used to identify a specific user.

In one embodiment, the user ID that is provided (or requested) is based upon an evaluation of which of the possible user ID's would provide the best capability for fraud prevention. For example, a user's birthday could be easily obtained (e.g., via social media, public records, etc.) so it would be a lower user ID option on a fraud scale. Similarly, a user's address could be easily obtained (e.g., via social media, public records, etc.) so it would also be a lower user ID option on a fraud scale. Further, a user's email could be easily obtained (e.g., via social media, public records, etc.) or easily guessed, so it would also be a lower user ID option on a fraud scale. In contrast, a social security number (or last four, six, seven, five, middle three, five, first 6, 7; middle three+last two; or any other amount or combination of the nine social security numbers) is much less likely to be obtained fraudulently (e.g., via social media, public records, guessed, etc.) so it may be that a pre-selected portion of the SSN (or a changing selected portion of the SSN) would be the user ID with the highest fraud prevention value.

In one embodiment, the request 211 could include an initial request provided by mobile device 110, a response from credit account system 210 for a different identification, and then one or more additional requests 211 from mobile device 110 until the desired identification information is obtained by credit account system 210.

In one embodiment, the request 211 is received by the credit account system 210 from mobile device 110 via the cloud, mobile network, WiFi, or the like. In another embodiment, credit account system 210 receives the request 211 from a website that has been accessed by mobile device 110 (e.g., via the cloud, WiFi, mobile network, or the like). Customer account identifier 225 utilizes device ID and/or customer ID information included in the request 211 to identify the customer.

For example, customer account identifier 225 will accesses database 227 which stores a plurality of customer credit accounts. In one embodiment, customer account identifier 225 accesses database 227 via cloud 226. An example of cloud 226 is a network such as the Internet, local area network (LAN), wide area network (WAN), or the like.

Database 227 may include store specific data, brand specific data, retailer specific data, a shared database, a conglomerate database, a portion of a larger storage database, and the like. Moreover, database 227 could be a local database, a virtual database, a cloud database, a plurality of databases, or a combination thereof.

Customer account identifier 225 uses the user ID and/or the device ID to perform a search of database 227 for one or more customer credit accounts, of the plurality of customer credit accounts within database 227, that are held by the customer. Once one or more customer credit accounts for the identified customer are found, they are provided by the customer account identifier 225 to customer data file builder 235 which links the one or more customer accounts together with the user ID and/or device ID to build a customer data file.

In one embodiment, database 227 also stores a plurality of customer reward accounts (and/or offers, coupons, and the like) and customer account identifier 225 searches database 227 for one or more customer reward accounts (and/or offers, coupons, and the like), of the plurality of customer reward accounts (and/or offers, coupons, and the like) within database 227, that are held by the identified customer. Once one or more customer reward accounts (and/or offers, coupons, and the like) for the identified customer are found, they are provided by the customer account identifier 225 to customer data file builder 235 which links the one or more customer reward accounts (and/or offers, coupons, and the like) held by the identified customer to the customer data file.

Token generator 240 then generates a token identifying the customer data file. In one embodiment the token is an identification number, hash, or other type of anti-tamper encrypted protection that is generated as an identifier for the customer data file. Although in one embodiment, a token is generated, it should be appreciated that there may be an identification scheme other than a token that is used. In one embodiment, the use of a token (or other identification tool) is provided for purposes of encryption, security, or the like.

Metadata file generator 245 generates a metadata file 250 formatted for mobile wallet 129, the metadata file 250 including a digital identifier for the pre-existing credit account and the token as tender vehicle 130. In one embodiment, the tender vehicle 130 could be an image, a scannable code, a near field communication (NFC) protocol, a sound, or the like. In one embodiment, the tender vehicle 130 includes the token embedded within the image data. In another embodiment, the token could be separate from the image that is presented when tender vehicle 130 is accessed and would be provided at the time of the transaction. For example, the token could be provided via a near field communication (NFC) between the mobile device 110 and the POS when tender vehicle 130 is presented at the POS. In another embodiment, the entire metadata file 250 could be provided via NFC at the time of the transaction and no imagery would be obtained by the POS even if it was presented on the display 112. In one embodiment, metadata file 250 includes an instruction that causes the tender vehicle 130 to be presented in a first location of mobile wallet 129 on the customer's mobile device 110.

The metadata file 250 is then provided from the credit account system 210 (e.g., a credit provider computer system, third-party computing system, or the like) to the customer's mobile device 110. The metadata file 250 is added to mobile wallet 129 on the customer's mobile device 110, wherein an access of the metadata file 250 in the mobile wallet causes the tender vehicle 130 to be presented by the customer's mobile device 110. Moreover, the presentation of mobile wallet ID 130 by the customer's mobile device 110 is utilized to provide payment at a time of a customer purchase as described herein. As stated herein, the presentation could be visual (e.g., a barcode on the display screen), electronic (e.g., an NFC, Bluetooth, or similar electronic communications protocol), sound, or a combination thereof.

Figure 3:
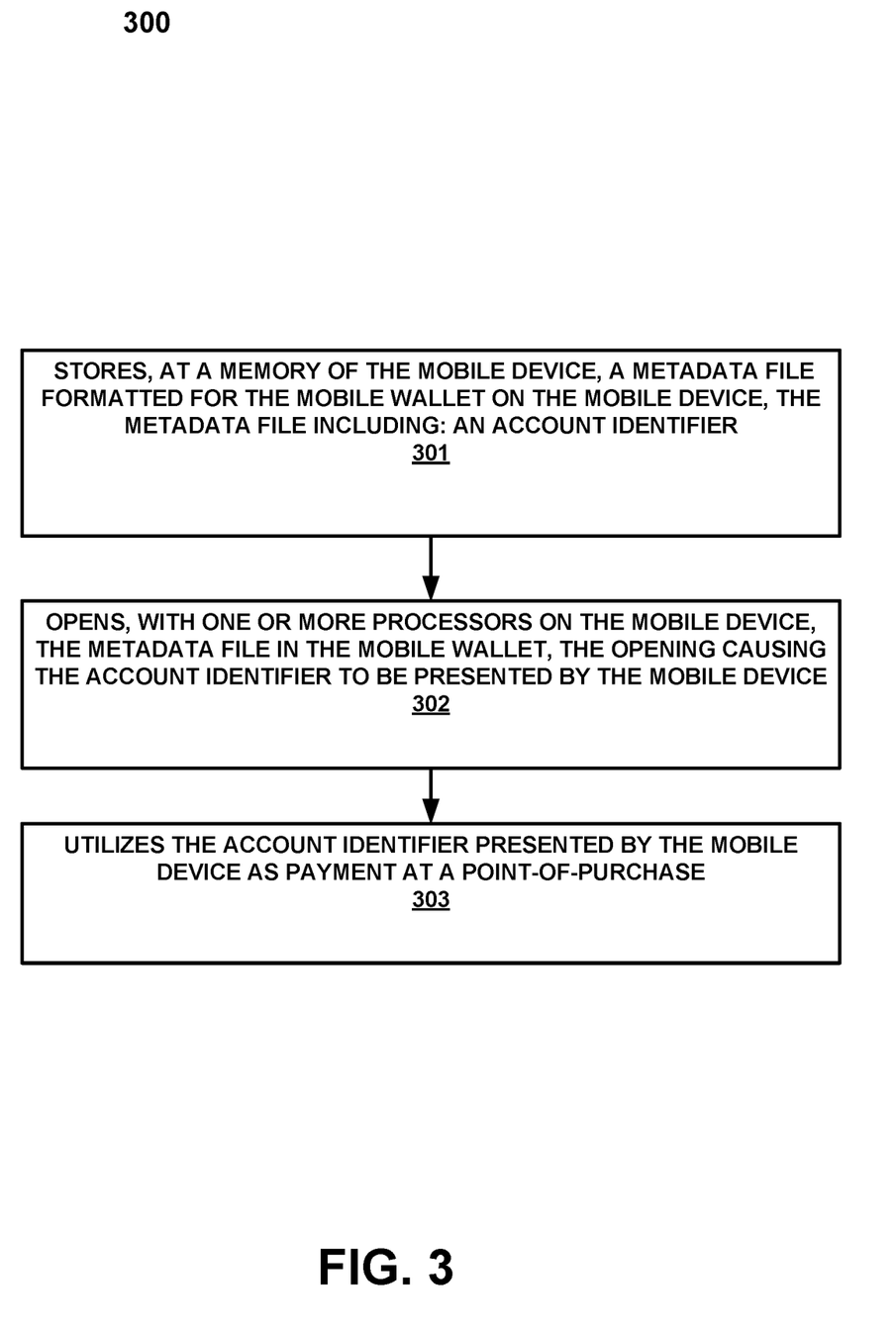
FIG. 3 is a flow diagram of a method for utilizing an image of a customer's ID, in a mobile wallet of a mobile device, to make a transaction, in accordance with an embodiment.

FIG. 3 is a flow diagram 300 of a method for utilizing tender vehicle 130 in mobile wallet 129 of a mobile device, to make a transaction, in accordance with an embodiment.

Referring now to 301 of FIG. 3, one embodiment stores, at a memory of the mobile device, a metadata file formatted for the mobile wallet 129 on the mobile device 110. The metadata file 250 including an account identifier. In general, the account identifier could be visual (e.g., a barcode on the display screen), electronic (e.g., an NFC, Bluetooth, or similar electronic communications protocol), sound, or a combination thereof.

In one embodiment, the tender vehicle 130 is added to mobile wallet 129, after a request 211 is received from a customer's mobile device 110. Once the request 211 is obtained from the customer's mobile device 110 it is provided to credit account system 210. In one embodiment, credit account system 210 is specific to a credit account provider. However, in another embodiment, credit account system 210 could be a third-party validation system, etc.

When credit account system 210 receives request 211, customer account identifier 225 searches the database 227 to identify and link any customer accounts to the user ID and/or mobile device ID contained in the request 211. In one embodiment, the customer account identifier 225 is specific to a given credit account provider. However, in another embodiment, customer account identifier 225 could be a third-party system.

In one embodiment, credit account system 210 would then build a customer data file that would include one or more credit accounts, reward accounts, promotion memberships, and the like. In one embodiment, the customer data file would be added to a database such as database 227. The database could be specific to a credit account provider, a rewards program provider, a third-party data storage system, or the like.

In one embodiment, when the customer data file is built, a token (e.g., an identification number, hash, or other type of anti-tamper encrypted protection) is generated for the customer data file. In one embodiment, the token is also added to a metadata file 250 that is built to meet any format, database, size, and storage requirements that are necessary for proper display and utilization in a customer's mobile wallet on the mobile device 110. For example, the metadata file 250 could include account information in the form of an image, an electronic communication, or the like that can be used in a mobile wallet format. The metadata file 250 is then be provided to the customer's mobile device 110 and upon reception by the mobile device it is added to the customer's mobile wallet 129 as tender vehicle 130.

With reference now to 302 of FIG. 3, one embodiment opens, with one or more processors on the mobile device 110, the metadata file in mobile wallet 129, the opening causing tender vehicle 130 to be presented by the mobile device 110. For example, after the metadata file 250 is added to the customer's mobile wallet 129, tender vehicle 130 would be accessible in the mobile wallet in the same way that any other items are accessed by mobile wallet 129. In one embodiment, the metadata file 250 could also include information that would make sure that the tender vehicle 130 is on the top of the mobile wallet stack. For example, when the customer opened the mobile wallet application, tender vehicle 130 would be the first in the stack that could include other payment cards, tickets, etc.

With reference now to 303 of FIG. 3 and to FIG. 2, one embodiment utilizes the tender vehicle 130 on the mobile device as payment at a point-of-purchase, POS, associates mobile checkout device, etc.

For example, the customer goes to a shop intending to make a purchase use a pre-existing credit account having an assigned physical credit card. However, at some point (up to and including the checkout process) the customer realizes that they do not have their physical credit card. The customer will send a request for a digital credit capability to the provider of the pre-existing credit account (or a representative, underwriter thereof). Once identified, the customer will receive the generated digital tender vehicle at the customer's mobile device 110. After receiving the tender vehicle 130, the customer will present it at the POS (or another checkout system such as an associate's mobile device, etc.). In general, the presentation at the time of checkout could include the transmission of tender vehicle 130 via NFC, a scan of the image associated with tender vehicle 130, a scanning of a barcode provided by tender vehicle 130, etc. In one embodiment, the token is provided in conjunction with the presentation. Thus, the token, metadata, barcode, image(s), or the like would be received at the POS and provided from the POS to the credit account provider (who would validate the tender vehicle 130 and link the purchase to the appropriate customer credit account). Once validated, the credit account provider would provide the authorization for the purchase to the POS and the transaction would be completed.

In one embodiment, the transaction could also include information from the device such as user biometric information, location information (e.g., provided by a GPS), the transaction time, the transaction date, etc. In one embodiment, the location information provided by the mobile device will include time and date stamp information. In another embodiment, the location, time and/or date could be obtained from the POS, a combination of the customer's mobile device and the POS, etc.

In one embodiment, for the transaction to occur, tender vehicle 130 would be validated using the internet connection from the POS, the biometric information for the customer identified by the ID (as provided via a token or the like) from the customer's mobile device, the location obtained from the mobile device, the time, the date of the transaction initiation, the mobile device identification number, etc.

In so doing, the security of the customer's tender vehicle 130 payment would be seamless and nearly instantaneous to the customer and the associate ringing up the transaction, but would include a plurality of checks and balances performed by the credit account provider, the brand, or a fraud determining evaluator assigned to make fraud mitigation determinations and/or evaluations.

In one embodiment, the customer could link a reward program to tender vehicle 130. As such, when tender vehicle 130 is utilized, the customer data file would identify and apply the appropriate reward program information with the designated credit account payment. In so doing, the customer would obtain the reward program points, discount, etc. and also pay for the meal without having to do more than present tender vehicle 130 at time of payment.

Figure 4:
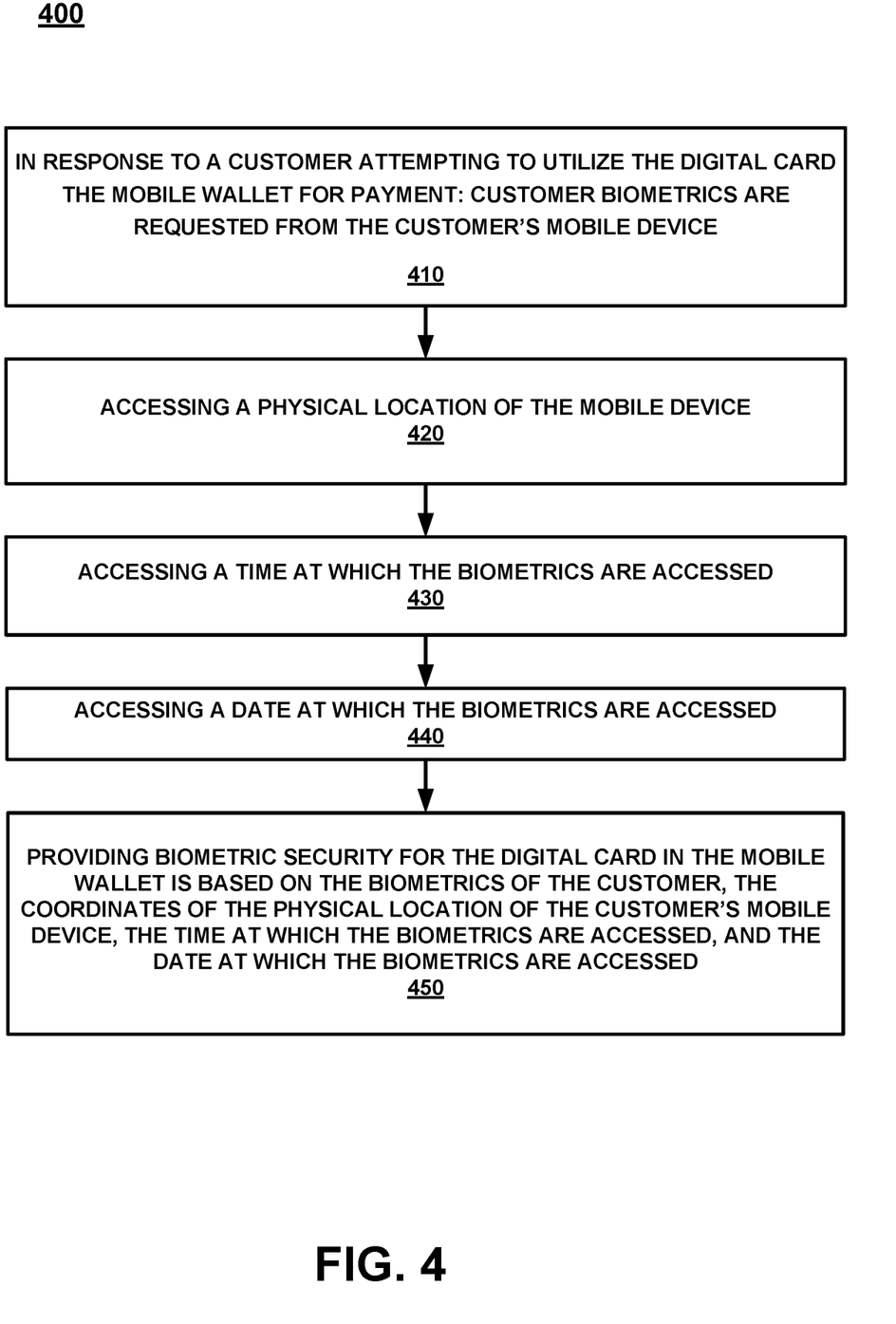
FIG. 4 is a process flow diagram for providing biometric security to determine that the customer whose is utilizing the mobile device is actually the customer whose ID is being provided via the mobile wallet, in accordance with an embodiment.

With reference now to FIG. 4, a flow diagram 400 for providing biometric security is shown, according to various embodiments. In general, the security pertains to determining that the customer whose is utilizing the mobile device is actually the customer whose tender vehicle 130 is being provided via the mobile wallet. The security described herein, enables authentication of the customer by way of biometrics. Biometrics can include, but are not limited to, thumb print scanning, voice detection, heart rate monitoring, eye/cornea detection, etc.

For example, if biometric security is enacted, or is deemed needed based on a risk factor, or the like, in order for the tender vehicle 130 to be utilized, biometric information will be requested to ensure the customer is properly identified.

In one embodiment, in addition to requiring biometric information, the transaction requirements could also include additional security parameters such as one or more of date, time and location. The additional security parameters may be determined at the moment in which the biometric information is accessed at mobile device 110. Additionally, the security parameters may also be accessed by various features of the mobile device, such as a GPS 118.

For example, when the customer provides the biometric information (e.g., fingerprint) at mobile device 110, the additional security parameters (e.g., date, time, and location) are determined by GPS 118. In particular, in response to the provided biometric information, GPS 118 determines the physical location of the mobile device 110 that includes a time and/or date stamp. In one embodiment, location information could be obtained by a device separate from mobile device 110. For example, location information could be obtained by systems such as, but not limited to, a geo-fence, a node (e.g., a beacon, WiFi node, an RFID node, a mobile phone provider node), an address, a lat-long, or the like.

In one embodiment, location information that is obtained outside of the customer's mobile device is provided to mobile device 110 such that it can be transmitted along with (in conjunction with, appended to, provided within, etc.) the tender vehicle 130 metadata. In one embodiment, location information that is obtained outside of the customer's mobile device is transmitted separate from the tender vehicle 130 metadata or from a device other than the customer's mobile device 110, such as a POS, store mobile device, beacon, etc. In one embodiment, if the location information is transmitted separately, it will be tied to the tender vehicle 130 metadata via a common identifier, such as, but not limited to, a customer number, a customer's mobile device ID, or the like. As such, if the tender vehicle 130 metadata and the location information are received separately, they can be correlated at a later time by the common identifier.

In one embodiment, if the biometric information is approved in combination with one or more of the additional security parameters, tender vehicle 130 can be used to perform the purchase.

In one example, the customer may have pre-approved location parameters in order to be authenticated. That is, if a location of the customer (or customer's mobile device) is determined to be within a location parameter, then tender vehicle 130 can be used. In the alternative, if a location of the customer is determined to be outside of a location parameter, then tender vehicle 130 cannot be used. For example, if, at the time the biometrics are obtained and approved, the customer is within a 50-mile radius of his/her home address (which is the pre-approved location parameter), the customer is authenticated, and tender vehicle 130 can be used. However, if, at the time the biometrics are obtained and approved, the customer is outside of the 50-mile radius of his/her home address (which is not a pre-approved location parameter), the customer is not authenticated, and tender vehicle 130 cannot be used to make a purchase.

In one embodiment, pre-approved time and/or date parameters are used to enable customer authentication. For example, if a date and/or time at which the biometric information is obtained correspond to a pre-approved time and/or date, then the customer is authenticated (if the biometric information is also authenticated) and tender vehicle 130 can be used. In one exemplary situation, the customer may have a pre-approved (or expected) time parameter of 9:00 AM to 7:00 PM. If biometric information is obtained in the time frame, then the customer is authenticated, and tender vehicle 130 can be used. However, if the biometric information is obtained outside of the time frame, then the customer is not authenticated, and tender vehicle 130 cannot be used.

At 410, in response to a customer initiating access to tender vehicle 130, biometrics of the customer are obtained. For example, the security procedure to authenticate the customer includes accessing biometric information (e.g., fingerprint). The biometric information can be captured by mobile device 110 (e.g., scanning of a finger for the fingerprint).

At 420, accessing a physical location of the mobile device. For example, when a customer attempts to use tender vehicle 130 for payment or even access tender vehicle 130, the customer is authenticated. The security procedure for authentication includes accessing the physical location of the customer (which is the physical location of the mobile device assuming that the mobile device is in proximity to the customer). In one embodiment, the physical location is determined by GPS 118.

At 430, a time at which the biometrics information is accessed is established. In one embodiment, the procedure also includes establishing a time when the physical location is determined. In one embodiment, a time stamp provided by GPS 118 is used to establish the time.

At 440, a date at which the biometrics are accessed is established. In one embodiment, the time stamp provided by GPS 118 determines the date.

At 450, the security of tender vehicle 130 is based on the biometrics of the customer, the physical location of the mobile device, the time at which the biometrics were accessed, and the date when the biometrics are accessed. In one embodiment, the date, time and location at which the biometric information is accessed is compared to an approved or expected date, time and location of the customer. If the date, time and location are approved and/or expected (as well as approved biometric information), then the customer is authenticated.

It is noted that any of the procedures, stated above, regarding flow diagram 400 may be implemented in hardware, or a combination of hardware with firmware and/or software. For example, any of the procedures are implemented by a processor(s) of a cloud environment and/or a computing environment.

With reference now to FIG. 5, portions of the technology for providing a communication composed of computer-readable and computer-executable instructions that reside, for example, in non-transitory computer-readable medium (or storage media, etc.) of a computer system. That is, FIG. 5 illustrates one example of a type of computer that can be used to implement embodiments of the present technology. FIG. 5 represents a system or components that may be used in conjunction with aspects of the present technology. In one embodiment, some or all of the components described herein may be combined with some or all of the components of FIG. 5 to practice the present technology.

FIG. 5 illustrates an example computer system 500 used in accordance with embodiments of the present technology. It is appreciated that computer system 500 of FIG. 5 is an example only and that the present technology can operate on or within a number of different computer systems including general purpose networked computer systems, embedded computer systems, routers, switches, server devices, user devices, various intermediate devices/artifacts, stand-alone computer systems, mobile phones, personal data assistants, televisions and the like. As shown in FIG. 5, computer system 500 of FIG. 5 is well adapted to having peripheral computer readable media 502 such as, for example, a disk, a compact disc, a flash drive, and the like coupled thereto.

Computer system 500 of FIG. 5 includes an address/data/control bus 504 for communicating information, and a processor 506A coupled to bus 504 for processing information and instructions. As depicted in FIG. 5, computer system 500 is also well suited to a multi-processor environment in which a plurality of processors 506A, 506B, and 506C are present. Conversely, computer system 500 is also well suited to having a single processor such as, for example, processor 506A. Processors 506A, 506B, and 506C may be any of various types of microprocessors. Computer system 500 also includes data storage features such as a computer usable volatile memory 508, e.g., random access memory (RAM), coupled to bus 504 for storing information and instructions for processors 506A, 506B, and 506C.

Computer system 500 also includes computer usable non-volatile memory 510, e.g., read only memory (ROM), coupled to bus 504 for storing static information and instructions for processors 506A, 506B, and 506C. Also present in computer system 500 is a data storage unit 512 (e.g., a magnetic disk drive, optical disk drive, solid state drive (SSD), and the like) coupled to bus 504 for storing information and instructions. Computer system 500 also can optionally include an alpha-numeric input device 514 including alphanumeric and function keys coupled to bus 504 for communicating information and command selections to processor 506A or processors 506A, 506B, and 506C. Computer system 500 also can optionally include a cursor control device 516 coupled to bus 504 for communicating user input information and command selections to processor 506A or processors 506A, 506B, and 506C. Cursor control device may be a touch sensor, gesture recognition device, and the like. Computer system 500 of the present embodiment can optionally include a display device 518 coupled to bus 504 for displaying information.

Referring still to FIG. 5, display device 518 of FIG. 5 may be a liquid crystal device, cathode ray tube, OLED, plasma display device or other display device suitable for creating graphic images and alpha-numeric characters recognizable to a user. Cursor control device 516 allows the computer user to dynamically signal the movement of a visible symbol (cursor) on a display screen of display device 518. Many implementations of cursor control device 516 are known in the art including a trackball, mouse, touch pad, joystick, non-contact input, gesture recognition, voice commands, bio recognition, and the like. In addition, special keys on alpha-numeric input device 514 capable of signaling movement of a given direction or manner of displacement. Alternatively, it will be appreciated that a cursor can be directed and/or activated via input from alpha-numeric input device 514 using special keys and key sequence commands.

Computer system 500 is also well suited to having a cursor directed by other means such as, for example, voice commands. Computer system 500 also includes an I/O device 520 for coupling computer system 500 with external entities. For example, in one embodiment, I/O device 520 is a modem for enabling wired or wireless communications between computer system 500 and an external network such as, but not limited to, the Internet or intranet. A more detailed discussion of the present technology is found below.

Referring still to FIG. 5, various other components are depicted for computer system 500. Specifically, when present, an operating system 522, applications 524, modules 526, and data 528 are shown as typically residing in one or some combination of computer usable volatile memory 508, e.g. random access memory (RAM), and data storage unit 512. However, it is appreciated that in some embodiments, operating system 522 may be stored in other locations such as on a network or on a flash drive; and that further, operating system 522 may be accessed from a remote location via, for example, a coupling to the internet. In one embodiment, the present technology, for example, is stored as an application 524 or module 526 in memory locations within RAM 508 and memory areas within data storage unit 512. The present technology may be applied to one or more elements of described computer system 500.

Computer system 500 also includes one or more signal generating and receiving device(s) 530 coupled with bus 504 for enabling computer system 500 to interface with other electronic devices and computer systems. Signal generating and receiving device(s) 530 of the present embodiment may include wired serial adaptors, modems, and network adaptors, wireless modems, and wireless network adaptors, and other such communication technology. The signal generating and receiving device(s) 530 may work in conjunction with one (or more) communication interface 532 for coupling information to and/or from computer system 500. Communication interface 532 may include a serial port, parallel port, Universal Serial Bus (USB), Ethernet port, Bluetooth, thunderbolt, near field communications port, WiFi, Cellular modem, or other input/output interface. Communication interface 532 may physically, electrically, optically, or wirelessly (e.g., via radio frequency) couple computer system 500 with another device, such as a mobile phone, radio, or computer system.

Computer system 500 is only one example of a suitable computing environment and is not intended to suggest any limitation as to the scope of use or functionality of the present technology. Neither should the computing environment be interpreted as having any dependency or requirement relating to any one or combination of components illustrated in the example computer system 500.

Figure 6:
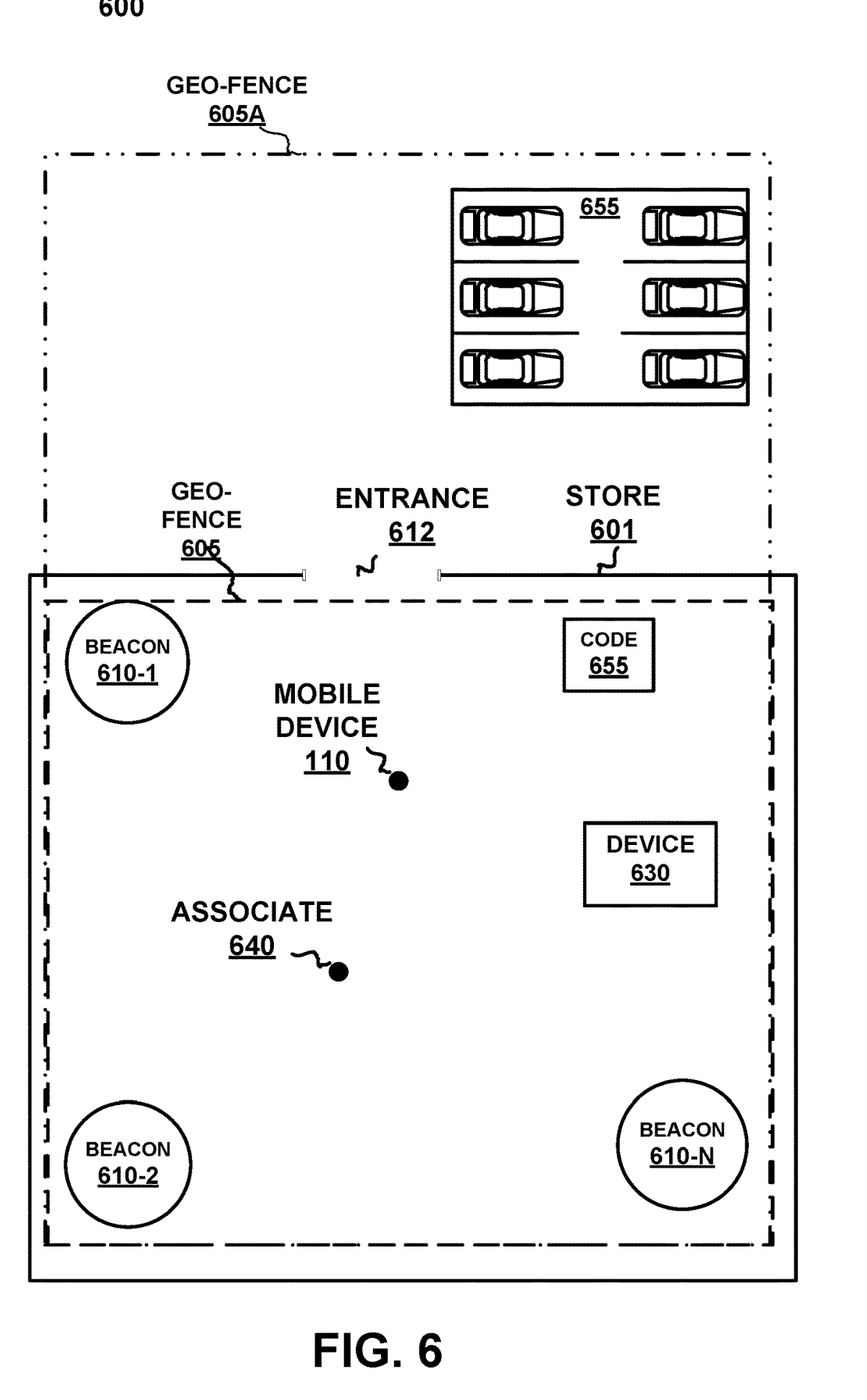
FIG. 6 is a block diagram of an embodiment of a retail establishment having one or more location identifying electronic capabilities in accordance with an embodiment.

Referring now to FIG. 6, a top plan view 600 of a store 601 is shown in accordance with an embodiment. In general, store 601 is any physical brick and mortar store that provides goods for sale at the store location. In one embodiment, store 601 includes an entrance 312. In addition, in different embodiments and configurations, store 601 can include one or more of, geo-fence 605, geo-fence 605a, beacons 610-1 through 610-n, store's electronic device 630 (which could be a fixed location computing device, a store's mobile device, an associate's mobile device, a WiFi node or the like), exterior space such as a parking lot 605, and code 655.

For purposes of the discussion, geo-fence 605 and geo-fence 605a refer to a virtual perimeter defining a real-world geographic area. Moreover, geo-fence 605 and geo-fence 605a can be created by various means that could be completely virtual or use physical components. One example of physical components to create a geo-fence 605 includes the use of beacons. For example, in FIG. 6, geo-fence 605 is a rectangle created by the physical locations of beacons 610-1, 610-2, and 610-n that includes the area at a boundary about store 601. In contrast, geo-fence 605a includes the area at a boundary about store 601, a parking lot 605 another part of a mall in which the store is located, and the like. It should be appreciated that geo-fence 605 and geo-fence 605a can be a number of different sizes and shapes.

Further, the one or more of beacons 610-1 through 610-n are devices configured to be communicatively coupled with mobile device 110, such as via near field communication (NFC), Bluetooth, WiFi, or the like. In one embodiment, one or more of beacons 610-1 through 610-n is an iBeacon™, which is an indoor positioning system from Apple Inc. For example, the iBeacon is a low-powered, low-cost transmitter that can notify nearby iOS and/or Android devices of their presence. Although a specific example is provided, the beacons are not limited to only that brand. Different beacons from other companies would also be acceptable.

In general, code 655 refers to a capturable code such as a 1D code, 2D code (bar code, QR code, UPC, visual images, etc.), 3D code, sound code, picture code, video code, or the like. In general, the capturable code could be captured with a camera, a microphone, or other capture capability on the user's mobile device 110.

The capturable code can be in-store, on-line, or the like. In-store examples of the code 655 could be a poster or other media on a wall in the store 601, a tri-fold or other media by a point-of-sale (POS), displayed on a screen in the store, displayed on an associate's tablet or other mobile device in the store, printed on the floor, etched in the glass, part of a sticker, etc. On-line examples include the code 655 displayed on a webpage, in an app, and the like.

In one embodiment, the result of the user's mobile device 110 interacting with a capturable code 655 is the generation of an electronic message (e.g., a text message, email, etc.) that is formatted and addressed (e.g., a text number or other short code) to deliver the electronic message to the appropriate agency. By having the capturable code automatically generate and format the electronic message, the user is saved the time required to open and address the electronic message. Moreover, the insertion of clerical errors will be reduced since the user is not keying in the formatted information (e.g., appropriate agency email, short code, text number, or the like).

In one embodiment, since the electronic message is formatted from instructions provided in the capturable code, the initial generated electronic message will include whatever information the capturable code requested when deployed by the appropriate agency. Such information could include a request for user ID information, a request for device ID information, a generation of metadata associated with the electronic message that includes device ID information, location information, user ID information, etc. In one embodiment, the automatic generation of the electronic message from the interaction with the capturable code could include automatic insertion of one or more pieces of customer or device information, a request for authorization to send an email with the automatically inserted information, a request for manual input of one or more of the pieces of information, a combination of automatic and manually input information, or the like.

Out-of-Band Verification

Figure 7:
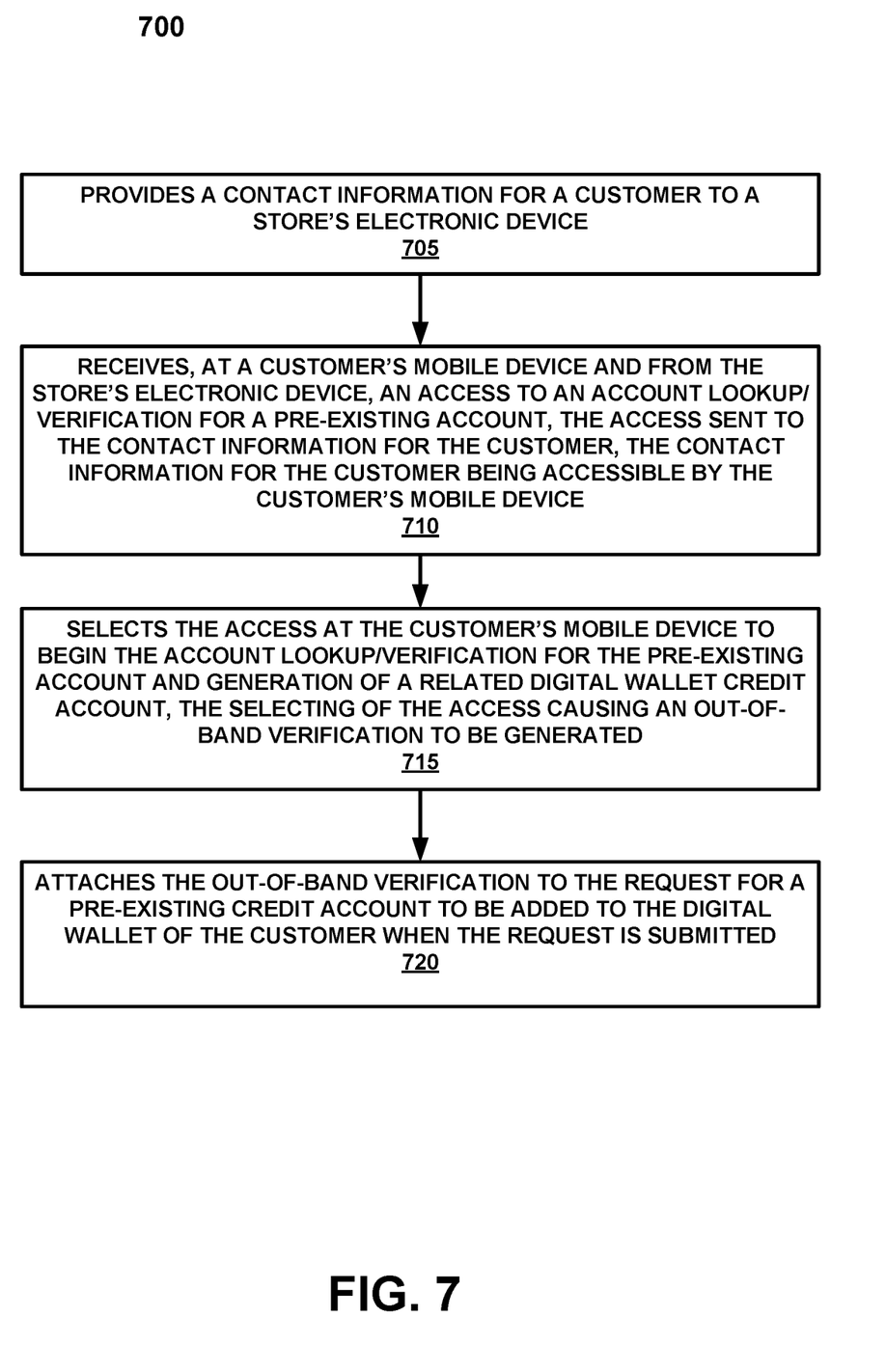
FIG. 7 is a flow diagram of a method for providing an out-of-band verification for an account lookup/verification for a pre-existing credit account and generation of a related digital wallet credit account, in accordance with an embodiment.

FIG. 7 is a flow diagram 700 of an out-of-band verification for an account lookup/verification for a pre-existing credit account and generation of a related digital wallet credit account, in accordance with an embodiment.

With reference now to 705 of FIG. 7, one embodiment provides a contact information for a customer to a store's electronic device 630. In one embodiment, the contact information could be provided to an associate 640 who is using a different store's electronic device. In general, the store's electronic device 630 (or associates electronic device) could be, but is not limited to, one or more of: a WiFi node, a beacon, an RFID node, a store's mobile device, a POS computing device, an associate's mobile device, and the like. Moreover, the store's mobile device or associate's mobile device could be an electronic device similar to those discussed in reference to mobile device 110.

In one embodiment, the telephone number of the customer's mobile device (e.g., mobile device 110) is the contact information for the customer. In one embodiment, a device identifier of the customer's mobile device is the contact information for the customer.

With reference now to 710 of FIG. 7, one embodiment receives, at a customer's mobile device and from the store's electronic device 630, an access to an account look-up for a pre-existing credit account, the access sent to the contact information for the customer, the contact information for the customer being accessible by the customer's mobile device 110. The access could be a web URL link (in a message), a link to an app for the customer's mobile device, an instruction to an app already on the customer's device, and the like.

In one embodiment, if the contact information for the customer is the telephone number of the customer's mobile device 110, then the access is received via a mobile telephone network communication sent to the telephone number of the customer's mobile device. In general, the access could be a text message, an email message, or the like.

In one embodiment, if the contact information for the customer is the device identifier of the customer's mobile device 110, then the access is received via a device-to device communication between the customer's mobile device and the store's electronic device 630. For example, the access could be a text message (SMS, MMS, or the like), an email message, or the like. For example, the access could be provided via a beacon (e.g., NFC, WiFi, or the like) from an associate's device, a store's mobile device, a store's POS computing device, an RFID, Bluetooth, or similar in an associate's name tag, badge, button, etc.

In one embodiment, the device-to-device communication between the customer's mobile device and the store's electronic device can include, for example, a data exchange, a hotspot interaction with one or more of the store's electronic device, a WiFi communication, a near field communication (NFC), and the like. For example, using a device bump, when a customer wants to begin the account lookup/verification for the pre-existing credit account, the store's electronic device is configured to send a signal to the customer's mobile device that will provide the initiation of the account lookup/verification to the customer's mobile device. In one embodiment, the store's electronic device will push the initiation of the account lookup/verification over NFC (Bluetooth, WiFi triggering link, or the like) to the customer's mobile device when a customer taps the store's electronic device with the customer's mobile device.

Referring now to 715 of FIG. 7, one embodiment selects the access at the customer's mobile device 110 to begin the account lookup/verification for the pre-existing credit account and generation of a related digital wallet credit account, the selecting of the access causing an out-of-band verification to be generate.

For example, the associate's mobile device will use a phone number provided by the customer. In so doing, the associate will send the message (text, SMS, MMS, email, or the like) to the phone number provided by the customer. When the text is opened on the customer's mobile device it will trigger the account lookup/verification process on the customer's mobile device. In one embodiment, the text message will be a web URL (link, etc.), and the selecting of the web URL will cause a web browser on the customer's mobile device to navigate to a web page containing the account lookup/verification procedure.

In another example, when the access is a link to an App for the customer's mobile device 110, selecting the link to the App will cause the customer's mobile device to queue the App for downloading to the customer's mobile device. The App could be downloaded automatically to the customer's mobile device or the customer could be queried, and permission obtained before the App is downloaded. Included in the App would be the ability for account lookup/verification and request for the generation of the related digital wallet credit account.

In one embodiment, the selection of the access will also interact with the cache or other memory on the customer's mobile device in order to obtain customer information that is stored on the customer's mobile device.

Referring now to 720 of FIG. 7, one embodiment attaches the out-of-band verification to the request for the pre-existing credit account to be added to the digital wallet of the customer when the request is submitted.

For example, since the store's electronic device 630 (e.g., an associate, a mounted electronic device, or the like) receives the customer contact information and then initiates the communication (e.g., sends the access to the customer's mobile device), the customer responding to the communication provided by the store's electronic device, becomes a part of the verification and fraud mitigation process.

In other words, since the store associate or customer enters the customer contact information into an interface that will then send an access to the customer's mobile device 110, and since the customer opens the access which initiates the account lookup/verification process on the customer's device 110, the customer contact information can be validated before the customer receives the access to the account lookup/verification and digital wallet credit account generating process. That is, the initiation of the request is happening in reverse, thereby allowing verification of the customer contact information before the account lookup/verification request can be performed. Moreover, the benefits of receiving the access from the store's electronic device 630 include fraud analysis, associate attribution, store attribution, and the like.

The present technology may be described in the general context of computer-executable instructions, such as program modules, being executed by a computer. Generally, program modules include routines, programs, objects, components, data structures, etc., that perform particular tasks or implement particular abstract data types. The present technology may also be practiced in distributed computing environments where tasks are performed by remote processing devices that are linked through a communications network. In a distributed computing environment, program modules may be located in both local and remote computer-storage media including memory-storage devices.

The foregoing Description of Embodiments is not intended to be exhaustive or to limit the embodiments to the precise form described. Instead, example embodiments in this Description of Embodiments have been presented in order to enable persons of skill in the art to make and use embodiments of the described subject matter. Moreover, various embodiments have been described in various combinations. However, any two or more embodiments may be combined. Although some embodiments have been described in a language specific to structural features and/or methodological acts, it is to be understood that the subject matter defined in the appended claims is not necessarily limited to the specific features or acts described above. Rather, the specific features and acts described above are disclosed by way of illustration and as example forms of implementing the claims and their equivalents.

What is claimed is:

1. A computer implemented method, the method comprising:
receiving a contact information for a customer at a store's electronic device;
receiving, at a customer's mobile device and from the store's electronic device, an access to an account lookup/verification for a pre-existing credit account;
selecting the access at the customer's mobile device to begin the account lookup/verification for the pre-existing credit account, the selecting of the access causing an out-of-band verification to be generated;
attaching the out-of-band verification to the request for the pre-existing credit account to be added to the customer's mobile device;
submitting the request for the pre-existing credit account to be added to the customer's mobile device; and
providing the pre-existing credit account to the customer's mobile device in a digital format, the digital format allowing the customer to use the customer's mobile device to make a purchase.

2. The computer implemented method of claim 1, wherein said contact information comprises a device identifier (ID).

3. The computer implemented method of claim 1, wherein said contact information comprises a user identifier (ID).

4. The computer implemented method of claim 1, wherein said contact information comprises:
a device identifier (ID); and
a user ID.

5. The computer implemented method of claim 1, wherein said contact information is part of a request for a pre-existing credit account to be added to the customer's mobile device.

6. The computer implemented method of claim 1, further comprising:
providing the contact information to a store associate; and
the store associate providing the contact information to the store's electronic device.

7. The computer implemented method of claim 1, further comprising:
wirelessly providing the contact information from the customer's mobile device to the store's electronic device.

8. The computer implemented method of claim 1, further comprising:

sending the access to the contact information for the customer; and accessing the contact information for the customer at the customer's mobile device.

9. The computer implemented method of claim 8, wherein the access is sent to the customer's mobile device from the group consisting of: a text message and an email message.

10. The computer implemented method of claim 8, wherein the access is selected from the group consisting of: a web URL, a link to an app for download to the customer's mobile device, and an instruction to an app already on the customer's mobile device.

11. The computer implemented method of claim 1, wherein the selecting of the access further comprises:

automatically causing the out-of-band verification to be generated.

12. The computer implemented method of claim 1, further comprising:

selecting the access at the customer's mobile device to begin a generation of a related digital wallet credit account for the pre-existing credit account.

13. The computer implemented method of claim 1, wherein selecting the access further comprises:

automatically initiating the account lookup/verification for the pre-existing credit account.

14. The computer implemented method of claim 1, further comprising:

incorporating an associate attribution with the access; and incorporating a store attribution with the access.

15. The computer implemented method of claim 1, further comprising:

providing the pre-existing credit account to a location in the customer's mobile device, the location from the group consisting of: a digital wallet of the customer's mobile device, and an application on the customer's mobile device.

\* \* \* \* \*